(12) United States Patent
Bakker et al.

(10) Patent No.: US 8,243,642 B2
(45) Date of Patent: Aug. 14, 2012

(54) METHOD OF PROVIDING A MULTIMEDIA SERVICE IN A DIGITAL WIRELESS COMMUNICATION NETWORK

(75) Inventors: Hajo Bakker, Eberdingen (DE); Dietrich Zeller, Sindelfingen (DE)

(73) Assignee: Alcatel Lucent, Paris (FR)

( * ) Notice: Subject to any disclaimer, the term of this patent is extended or adjusted under 35 U.S.C. 154(b) by 1053 days.

(21) Appl. No.: 10/893,389

(22) Filed: Jul. 19, 2004

(65) Prior Publication Data

US 2005/0036455 A1    Feb. 17, 2005

(30) Foreign Application Priority Data

Aug. 11, 2003   (EP) ..................................... 03292005

(51) Int. Cl.
*H04H 20/71*       (2008.01)
(52) U.S. Cl. ........ 370/312; 370/432; 370/335; 370/338; 455/450; 455/452.1; 455/452.2; 455/69; 455/431; 455/449; 375/240; 709/249
(58) Field of Classification Search .......... 370/310–350, 370/432; 455/450, 69, 431, 449, 452.1, 452.2; 375/240; 709/249
See application file for complete search history.

(56) References Cited

U.S. PATENT DOCUMENTS

| | | | |
|---|---|---|---|
| 6,801,512 B1 * | 10/2004 | Cudak et al. ................. | 370/332 |
| 7,103,319 B2 * | 9/2006 | Cai et al. ......................... | 455/69 |
| 7,171,212 B2 * | 1/2007 | Kim et al. ..................... | 455/450 |
| 7,180,885 B2 * | 2/2007 | Terry ............................. | 370/338 |
| 7,200,125 B2 * | 4/2007 | Lohtia et al. .................. | 370/329 |
| 7,263,125 B2 * | 8/2007 | Lainema .................. | 375/240.04 |
| 2003/0043786 A1 * | 3/2003 | Kall et al. ..................... | 370/352 |
| 2003/0101274 A1 | 5/2003 | Yi et al. | |
| 2003/0147370 A1 * | 8/2003 | Wu ................................ | 370/338 |
| 2004/0014482 A1 * | 1/2004 | Kwak et al. ................... | 455/522 |
| 2004/0158646 A1 * | 8/2004 | Miernik et al. ............... | 709/249 |
| 2004/0229624 A1 * | 11/2004 | Cai et al. ....................... | 455/449 |
| 2007/0021117 A1 * | 1/2007 | McKenna et al. ............. | 455/431 |

FOREIGN PATENT DOCUMENTS

| | | |
|---|---|---|
| WO | WO 96/22666 A1 | 7/1996 |
| WO | WO 99/13666 A1 | 3/1999 |
| WO | 03/015440 A1 | 2/2003 |
| WO | 03/030453 A2 | 4/2003 |

OTHER PUBLICATIONS

"Universal Mobile Telecommunication System (UMTS); Multimedia Broadcast/Multicast Service (MBMS); Stage 1 (3GPP TS 22.146 version 5.2.0 release 5)" ETSI TS 122 146 v5.2.0, XX,XX, Mar. 1, 2002, pp. 1-15, XP002208067.

(Continued)

*Primary Examiner* — Amancio Gonzalez
(74) *Attorney, Agent, or Firm* — Sughrue Mion PLLC

(57) ABSTRACT

A method of providing a multimedia multicast service in a digital wireless communication network, the network having a network controller for controlling of at least one base station, comprising establishing a single data stream from the network controller to the base station for transmitting of multimedia data, by means of a single Iub link or transport bearer and establishing a separate communication link and a separate data queue for each user equipment in a radio cell of the base station which requests the multimedia data.

14 Claims, 5 Drawing Sheets

OTHER PUBLICATIONS

3$^{rd}$ Generation Partnership Project; Technical Specification group Radio Access Network; Introduction of the Multimedia Broadcast Multicast Service (MBMS) in Radion Access Network (Stage-2); (Release 6), 3GPP TS 25.430 V3.0.0 (Jan. 2000), pp. 1-16, Jan. 2003. "UTRAN lub Interface: General Aspects and Principles" ARIB STD-T63-25.430 V3.0.0, Jan. 2000, pp. 1-21.

3GPP TS 25.346 V1.1.0 (May 2002) 3rd Generation Partnership Project; Technical Specification Group Radio Access Network; Introduction of the Multimedia Broadcast Multicast Serivice (MBMS) in the Radio Access Network (Stage-2); (Release 6).

3GPP TS 25.346 V1.5.0 (Mar. 2003) 3rd Generation Partnership Project; Technical Specification Group Radio Access Network; Introduction of the Multimedia Broadcast Multicast Service (MBMS) in the Radio Access Network (Stage-2); (Release 6).

3GPP TS 25.346 V1.3.0 (Jan. 2003) 3rd Generation Partnership Project; Technical Specification Group Radio Access Network; Introduction of the Multimedia Broadcast Multicast Service (MBMS) in the Radio Access Network (Stage-2); (release 6).

* cited by examiner

METHOD OF PROVIDING A MULTIMEDIA SERVICE IN A DIGITAL WIRELESS COMMUNICATION NETWORK

FIELD OF THE INVENTION

The invention is based on a priority application EP03292005.0 which is hereby incorporated by reference.

The present invention relates to the field of telecommunications, and more particularly without limitation, to multimedia multicast and multimedia broadcast services.

BACKGROUND AND PRIOR ART

Point to multi point services exist today which allow data from a single source entity to be transmitted to multiple end points. These services are expected to be used extensively over wireless networks. In particular there is a strong interest to provide multimedia broadcast/multicast service over 3G networks.

The multimedia broadcast/multicast service (MBMS) which is considered for the universal mobile telecommunications systems (UMTS) is a unidirectional point-to-multi point bearer service in which data is transmitted from a single source entity to multiple recipients. 3GPP has defined two modes of operation: (i) the broadcast mode and (ii) the multicast mode.

The broadcast mode is a unidirectional point-to-multi point transmission of multimedia data from a single source entity to all users in a broadcast area or areas. Data is transmitted to broadcast areas as defined by the network. A broadcast service received by a user equipment involves one or more successive broadcast sessions. A broadcast service might, for example, consist of a single on-going session, e.g. a media stream, or may involve several intermittent sessions over an extended period of time, e.g. messages. An example of a service using the broadcast mode could be advertising or a welcome message to the network. As not all users attached to the network may wish to receive these messages then the user shall be able to enable/disable the reception of these broadcast services on his user equipment. A disadvantage of the broadcast mode is that power control cannot be performed individually for the user equipment.

The multicast mode enables the unidirectional point-to-multi point transmission of multimedia data from a single source point to a multicast group in a multicast area. Like in the broadcast mode data is transmitted to multicast areas as defined by the network. In the multicast mode there is the possibility for the network to selectively transmit to cells within the multicast area which contain members of a multicast group. Such multicast services allow unidirectional point-to-multi point transmission of multimedia data, e.g. text, audio, picture, video, from a single source point to a multicast group in a multicast area. An example of a service using the multicast mode could be an information service for which a subscription is required, e.g. a football results service for which a subscription is required.

In the multicast mode data is streamed in parallel from the radio network controller to the node-B for transmission to the user equipment. For further technical information on the multimedia broadcast/multicast service (MBMS) reference is made to ETSI TS 122 146 V5.2.0(2002-03) and 3GPP TS 25.346 V1.3.0(2003-01) the entirety of which is herein incorporated by reference.

Broadcast and multicast services for other digital wireless communication networks, such as digital TV, DVD-T and DVB-M are also considered in "Broadcast and Multicast Services in Mobile Networks, Ahmavaara K., Jolma P. and Raivio Y." (http://www.nokia.com/downloads/aboutnokia/research/library/mobile_networks/MNW9.pdf)

SUMMARY OF THE INVENTION

The present invention provides a multimedia multicast service method for a digital wireless communication network, such as a UMTS-type network. Such a network has network controllers for controlling of base stations. In the case of UMTS the network controllers are referred to as "radio network controllers" (RNCs) whereas the base stations are referred to as "node-Bs".

Multimedia data of the multimedia multicast service is transmitted from the network controller to the base station by means of a single data stream. This compares to the 3GPP MBMS where multiple redundant data streams are established between the RNC and the node-B. This way the present invention enables to make better usage of the available data transmission capacity between the network controller and the base station.

In the multicast mode when using point to point beareres a separate communication link and a separate data queue is established for each user equipment in a radio cell of the base station which requests the multimedia data. This enables to separately control the transmission power of each one of the communication links.

In accordance with a preferred embodiment of the invention the data stream from the network controller to the base station is transmitted via a single Iub link. The UTRAN Iub interface is as such known from the prior art and is specified in 3G TS 25.430 V3.0.0(2000-01), pages 1 to 21. In accordance with the 3GPP MBMS specification multiple Iub links or transport bearers are required for transmitting of multiple data streams in parallel from the RNC to the node-B. In contrast the present invention enables to use a single Iub link for transmitting of the single data stream containing the multimedia data.

In accordance with a further preferred embodiment of the invention high speed downlink packet access (HSDPA) is used in order to realize the separate data queues for the multicast service. HSDPA is a packet-based data service which is as such known in the prior art and which has been specified by 3GPP.

In accordance with a further preferred embodiment of invention the requests of the user equipment for multimedia service are signaled to the network controller. The network controller controls the base station which services the respective user equipment to establish respective separate data queues for streaming of the multimedia data to the user equipment.

A further aspect of the invention is the provision of multimedia broadcast services and multicast in a digital wireless communication network by means of point to multipoint bearers. As in the multicast mode a single data stream between the network controller and the base station is established for transmitting of the multimedia data. Again this can be implemented by using a single Iub link for the single multimedia data stream.

The multimedia data stream is distributed to a plurality of user equipment in the same radio cell by establishing a single data queue for the plurality of user equipment. In other words a separate data queue is established for each radio cell which is serviced by the base station. Again HSDPA can be used for realization of the data queue.

In accordance with a further aspect of the invention the usage of point to point or point to multipoint is selected depending on the number of active user equipment per radio cell or per base station. If the number of user equipment is below a threshold value point to point is selected by the network controller or the node-B. If the number of user equipment which is serviced by the base station surpasses a certain threshold level the network controller switches the base station to point to multi point.

BRIEF DESCRIPTION OF THE DRAWINGS

In the following preferred embodiments of the invention will be described in greater detail by making reference to the drawings in which.

DETAILED DESCRIPTION

Figure 1:
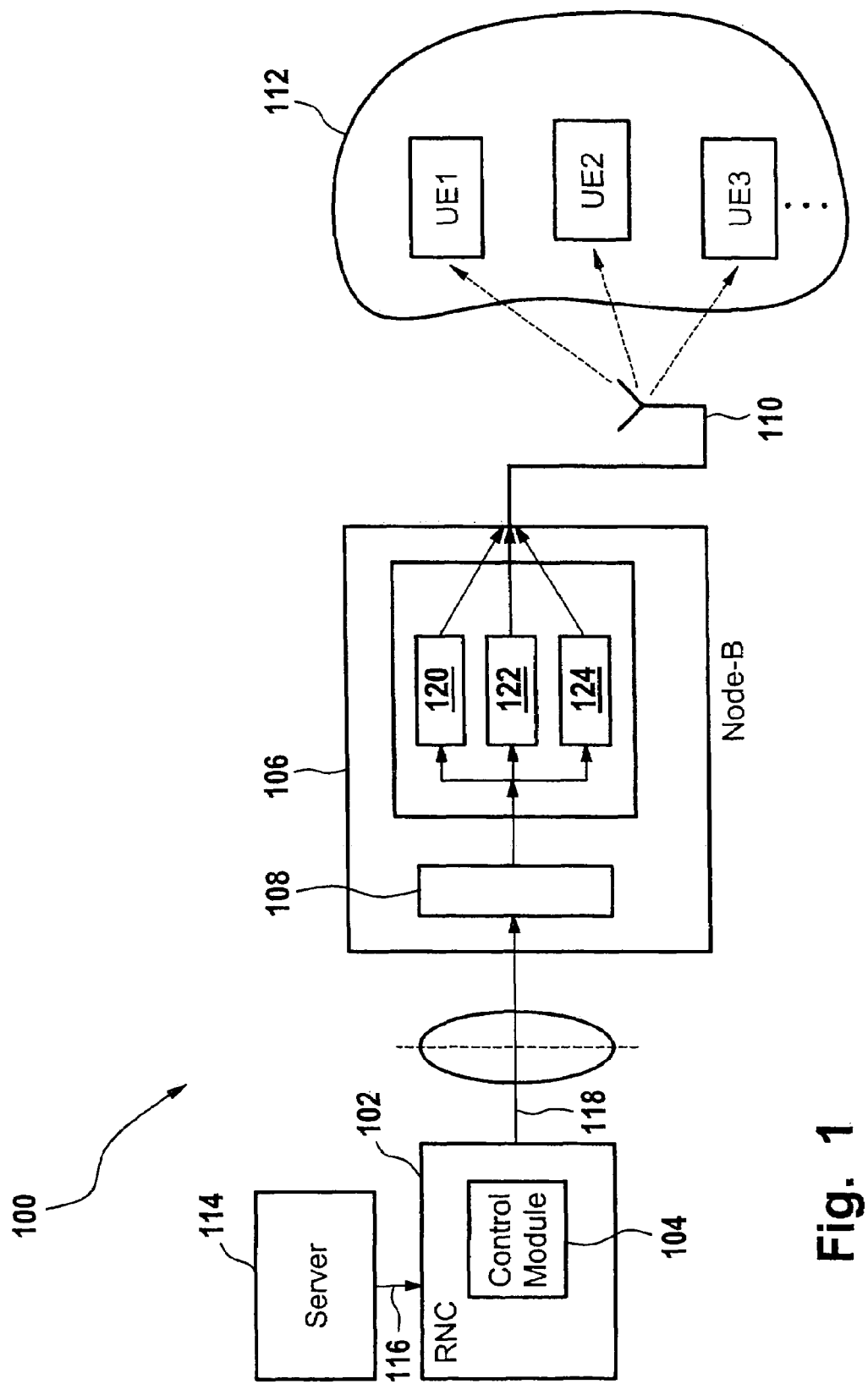
FIG. 1 is a block diagram of a telecommunication system with a node-B in multicast mode.

FIG. 1 shows a block diagram of wireless telecommunication system, such as a UMTS-type system. Telecommunication system 100 has radio network controller (RNC) 102. Radio network controller 102 has control module 104 for controlling node-B 106.

Node-B 106 has control module 108 for controlling the internal operation of node-B 106 and for receiving control commands from control module 104 of radio network controller 102.

Preferably the interface between radio network controller 102 and node-B 106 is based on the Iub standard definition. The Iub interface is a logical interface for the interconnection of Node-B and Radio Network Controller components of the UMTS Terrestrial Radio Access Network (UTRAN). The radio network control signaling between these nodes is based on the Node B application part (NBAP). The control commands from Radio Network Controller to the Node-B can be transmitted by using the signaling transport related to NBAP signaling across the Iub Interface.

Node-B 106 is coupled to antenna 110 for providing telecommunication services to user equipment (UE) 1, 2, 3 . . . .

In operation server computer 114 is coupled to radio network controller 102 for providing multimedia data stream 116 to radio network controller 102. For transmission of multimedia data stream 116 from server computer 114 to radio network controller 102 any suitable transmission medium, such as the Internet, can be utilized.

A single Iub link 118 is established between radio network controller and node-B 106 for transmission of multimedia data stream 116 from radio network controller 102 to node-B 106. Control module 108 of node-B 106 receives a control command from control module 104 of radio network controller 102. In response control module 108 controls node-B 106 to establish respective separate data queues 120, 122, 124, . . . for each one of the active user equipment, i.e. UE1, UE2, UE3, . . . . Preferably each one of the data queues is d HSDPA queue.

The data queues 120, 122, 124, . . . serve to buffer multimedia data stream 116 for transmission via antenna 110 to the corresponding user equipment UE1, UE2, UE3, . . . Using of HSDPA in the multicast mode has the advantage that the transmission power can be controlled individually for each one of the user equipment.

The present invention is particularly advantageous as it enables to use a single Iub link 118 for transmission of multimedia data stream 116 from radio network controller 102 to node-B 106. This way the transmission of multiple redundant multimedia data streams from radio network controller 102 to node-B 106 is avoided. Another advantage is that the point to point multi cast mode in which node-B 106 is operated in the example considered here enables to control the transmission power for each one of the multi cast communication links separately.

If node-B 106 has HSDPA capability one implementation option is to enhance the MAC-hs functionality in node-B 106 by introducing a duplication function which duplicates multimedia data stream 116 which is received via the single Iub link 118 and distributes it internally toward the user equipment specific data queues 120, 122, 124, . . . , i.e. HSDPA priority queues.

Figure 2:
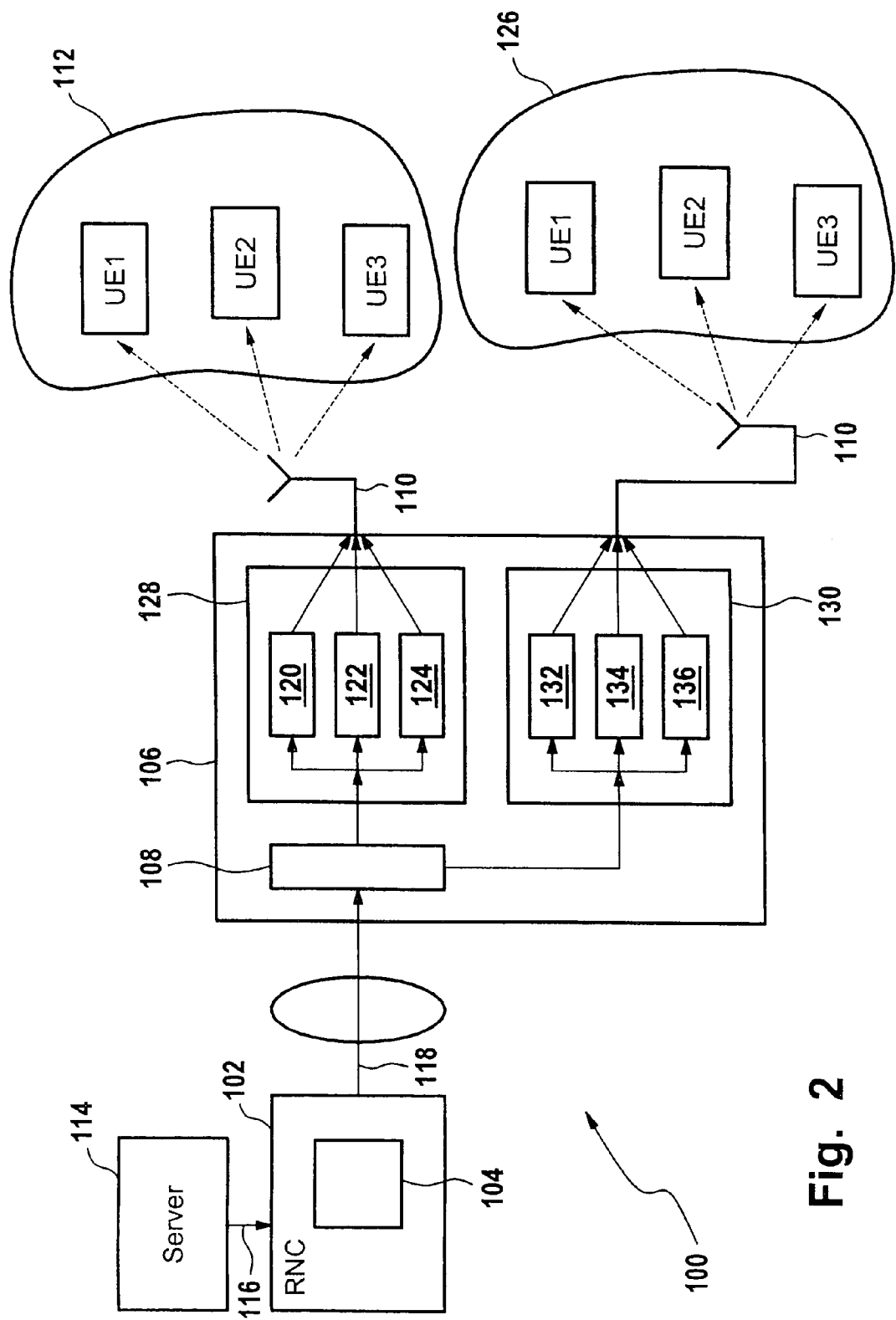
FIG. 2 is a block diagram of a telecommunication system with a node-B in multicast mode servicing user equipment in two different radio cells.

FIG. 2 shows telecommunication system 100 when node-B 106 provides multimedia point to point multi cast service to user equipment UE1, UE2, UE3 in radio cell 112 as well as to user equipment UE1, UE2, UE3 in another radio cell 126. In this case control module 108 of node-B 106 receives a control command from control module 104 in order to establish separate data queues for each one of the user equipment in the respective radio cells within different MAC-hs entities 128 and 130. MAC-hs entity 128 has data queues 120, 122, 124 for respective user equipment within radio cell 112, i.e. UE1, UE2, UE3. Likewise data queues 132, 134, 136 are created in MAC-hs entity 130 for respective user equipment within radio cell 126, i.e. UE1, UE2, and UE3 of radio cell 126. Again it is preferred to implement the data queues as HSDPA priority queues.

Figure 3:
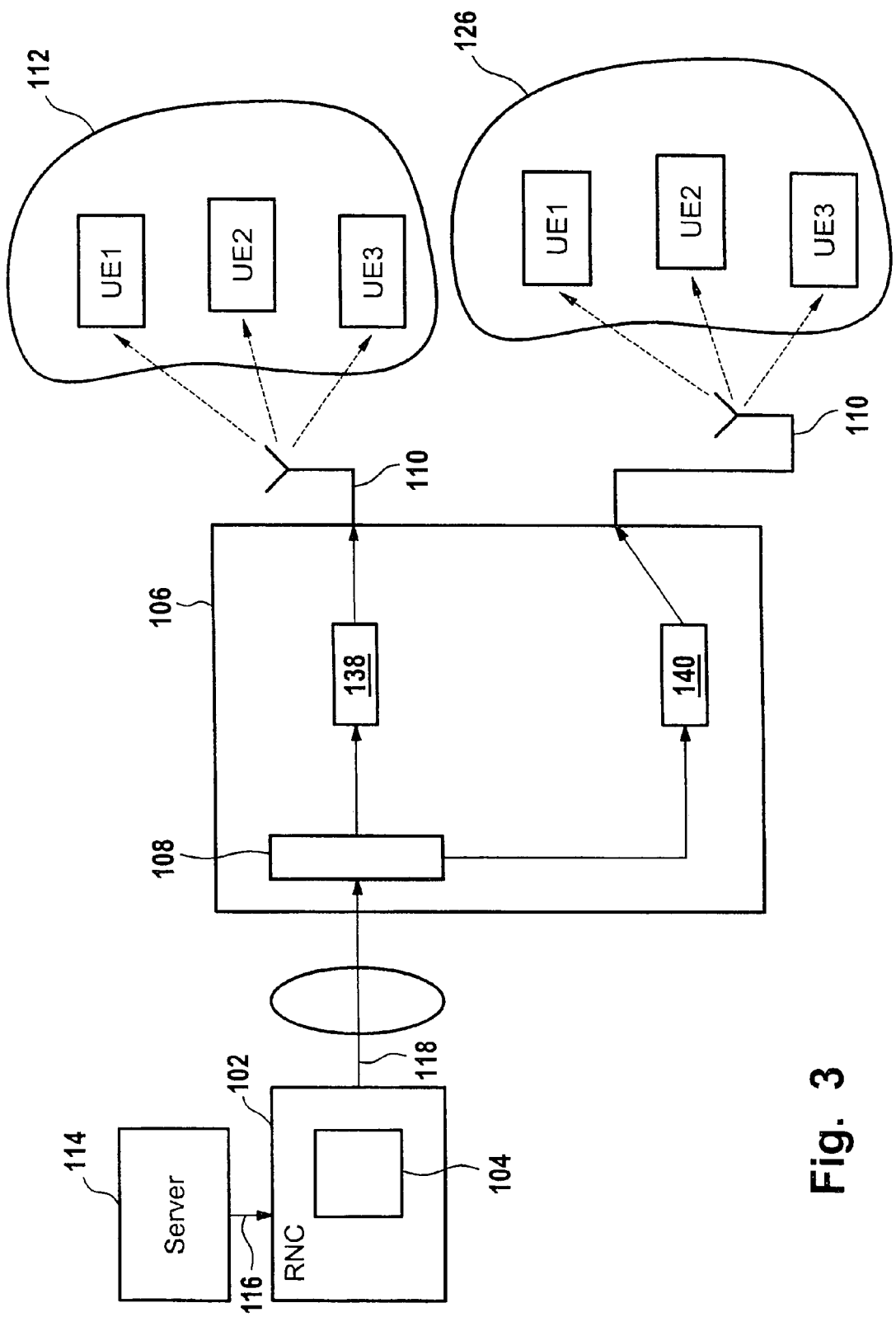
FIG. 3 is a block diagram of a telecommunication system with a node-B in a broadcast mode.

FIG. 3 shows telecommunication system 100 when node-B 106 is in a point to multipoint transmission mode. In this case control module 108 of node-B 106 receives a control command from control module 104 of radio network controller 102 to establish separate data queues 138, 140 for respective radio cells which are covered by node-B 106, i.e. radio cells 112 and 126, respectively. Preferably data queues 138 and 140 are implemented as HSDPA priority queues.

It is to be noted that as in the point to point multicast mode (c.f. FIG. 1 and FIG. 2) only a single Iub link 118 is established between radio network controller 102 and node-B 106 for transmission of multimedia data stream 116. This way efficient usage is made of the available bandwidth resources.

Figure 4:
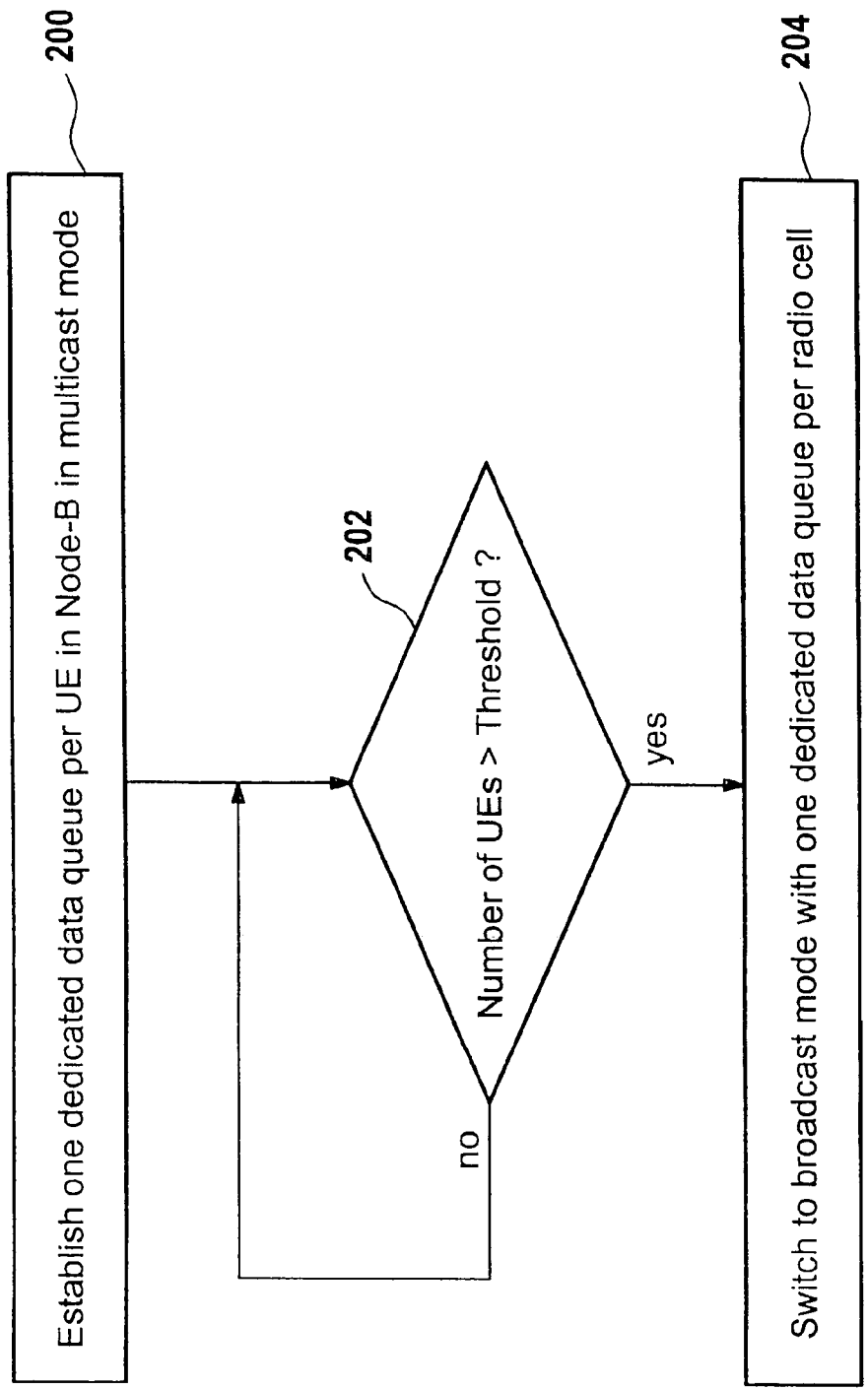
FIG. 4 is a flow chart being illustrative of the selection of the point to point or point to multipoint multicast mode.

FIG. 4 shows a corresponding flowchart. In step 200 data transmission is started in the point to point multicast mode as the number of user equipment requesting multimedia services is relatively low. Hence a dedicated data queue is created in the node-B which services the respective user equipment as explained in detail above with reference to FIGS. 1 and 2.

In step 202 it is checked if the number of user equipment per radio cell requesting the multimedia service surpasses a predefined threshold level. If this is not the case no action is taken and the check of step 202 is performed again at periodic intervals.

If the contrary is true the control goes from step 202 to step 204. In step 204 node-B is switched to the point to multipoint multi cast mode with only one dedicated data queue per radio cell. Preferably this is done on a per cell basis such that a hybrid mode of operation of node-B can result as illustrated in FIG. 5.

Figure 5:
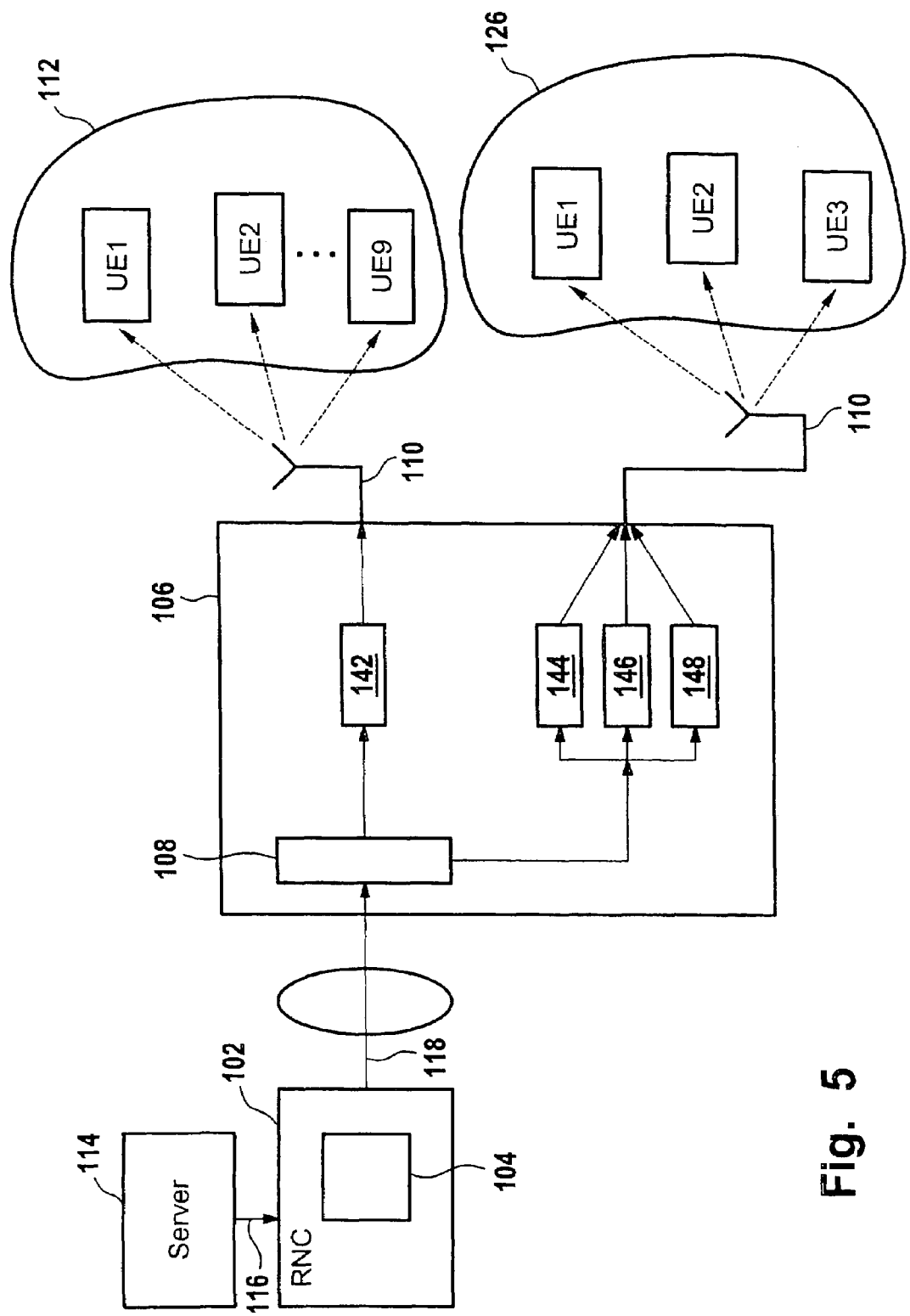
FIG. 5 is a block diagram of a telecommunication system with a node-B in a hybrid broadcast/multicast mode.

In the example shown in FIG. 5, there are nine user equipment UE1, UE2, ... UE9 within radio cell 112 which request the multimedia service. In radio cell 126 there are just three user equipment, UE1, UE2, UE3 which request the multimedia service. As a consequence a determination is made by control module 104 in accordance with the method as illustrated in FIG. 4 that the streaming to the user equipment within radio cell 126 is to be performed in a point to point multicast mode whereas the streaming through the user equipment within radio cell 112 is to be performed in a point to multipoint multi cast mode.

Control module 108 receives a corresponding control command from control module 104 and controls node-B 106 to establish a single data queue 142 for transmitting of multimedia data stream 116 to the user equipment within radio cell 112 and to establish separate data queues 144, 146, 148 for respective user equipment in radio cell 126, i.e. UE1, UE2 and UE3 or radio cell 126.

It is to be noted that the control module 104 can be implemented in the node-B or that the control function of control module 104 is shared by node-B and the radio network controller.

LIST OF REFERENCE NUMERALS 100 telecommunication system
102 RNC
104 control module
106 node-b
108 control module
110 antenna
112 radio cell
114 server computer
116 multimedia data stream
118 Iub link
120 data queue
122 data queue
124 data queue
126 radio cell
128 MAC-hs entity
130 MAC-hs entity
132 data queue
134 data queue
136 data queue
138 data queue
140 data queue
142 data queue
144 data queue
146 data queue

The invention claimed is:

1. A control hardware module for selecting a transmission mode between a network node of a wireless communication network and a wireless access network node of the wireless communication network based on a threshold number of user equipments requesting a data service in a radio cell, wherein when a number of user equipments requesting the data service is below the threshold number, the control module is configured to select a point to point transmission mode with a single link from the network node to the wireless access network node and with separate data queues at the wireless access network node for each user equipment, and when the number of user equipments requesting the data service is above the threshold number, the control module is configured to select a point to multipoint transmission mode with a single link from the network node to the wireless access network node and with a single data queue at the wireless access network node for the user equipments.

2. The control module according to claim 1, wherein when the number of user equipments requesting the data service is below the threshold number, the control module is further configured to select the point to point transmission mode with separate communication links between the wireless access network node and each user equipment.

3. The control module according to claim 1, wherein the control module is configured to separately select the transmission mode for each radio cell of the wireless access network node.

4. The control module according to claim 1, wherein the separate data queues are realized as separate HSDPA queues.

5. The control module according to claim 1, wherein the data are multimedia data requested by the user equipments.

6. A network node comprising a control module according to claim 1.

7. The network node according to claim 6, wherein the network node is a network controller.

8. A wireless access network node comprising a control module according to claim 1.

9. The wireless access network node according to claim 8, wherein the wireless access network node is configured to receive a control message from another network node to establish a number of the separate data queues corresponding to the number of user equipments requesting a data service.

10. A wireless access network node according to claim 8, wherein the wireless access network node is a base station.

11. A wireless communication network comprising:
a wireless access network node, and the network node according to claim 6 for transmitting data to the wireless access network node with the transmission mode based on the threshold number of user equipments requesting the data service in the radio cell.

12. The wireless communication network comprising:
the wireless access network node according to claim 8, and a network node for transmitting data to the wireless access network node with a transmission mode based on the threshold number of user equipments requesting the data service in a radio cell.

13. The wireless communication network according to claim 11 or claim 12, further comprising at least one user equipment receiving data of the data service.

14. User equipment for a wireless communication network comprising a receiver to receive data from a network node according to claim 6 or from a wireless access network node according to claim 8.

* * * * *